(12) United States Patent
Bean

(10) Patent No.: US 7,862,261 B2
(45) Date of Patent: Jan. 4, 2011

(54) TOOL HOLDER WITH RESHARPENABLE CUTTING TOOL INSERTS

(75) Inventor: Leslie V. Bean, Waterbury, CT (US)

(73) Assignee: Century Tool & Design, Inc., Milldale, CT (US)

( * ) Notice: Subject to any disclaimer, the term of this patent is extended or adjusted under 35 U.S.C. 154(b) by 307 days.

(21) Appl. No.: 12/229,848

(22) Filed: Aug. 27, 2008

(65) Prior Publication Data

US 2009/0060664 A1   Mar. 5, 2009

Related U.S. Application Data

(60) Provisional application No. 60/966,380, filed on Aug. 27, 2007.

(51) Int. Cl.
*B23B 29/12* (2006.01)
*F16B 35/00* (2006.01)

(52) U.S. Cl. .......................................... 407/49; 407/41

(58) Field of Classification Search ................ 407/102, 407/49, 47, 41, 87, 94, 108; 411/389
See application file for complete search history.

(56) References Cited

U.S. PATENT DOCUMENTS

| 3,138,847 | A | * | 6/1964 | Berry, Jr. | 407/46 |
| 3,176,377 | A | * | 4/1965 | Milewski | 407/77 |
| 3,545,060 | A | * | 12/1970 | Mitchell | 407/103 |
| 3,755,868 | A | * | 9/1973 | LaForge et al. | 407/75 |
| 4,200,416 | A | * | 4/1980 | Kezran | 407/108 |

* cited by examiner

*Primary Examiner*—Will Fridie, Jr.
(74) *Attorney, Agent, or Firm*—Alix, Yale & Ristas, LLP

(57) ABSTRACT

A tool holder for a resharpenable cutting tool insert has a body portion which includes a recess. A wedge member is positioned in the recess. A locking screw locks the wedge member such that the top surface of the wedge member is in engagement with the bottom surface of the insert and the locking screw is threadably connected to the body portion and to the wedge member so that the cutting tool insert may be removed for sharpening and re-inserted at the same location relative to the tool holder.

10 Claims, 3 Drawing Sheets

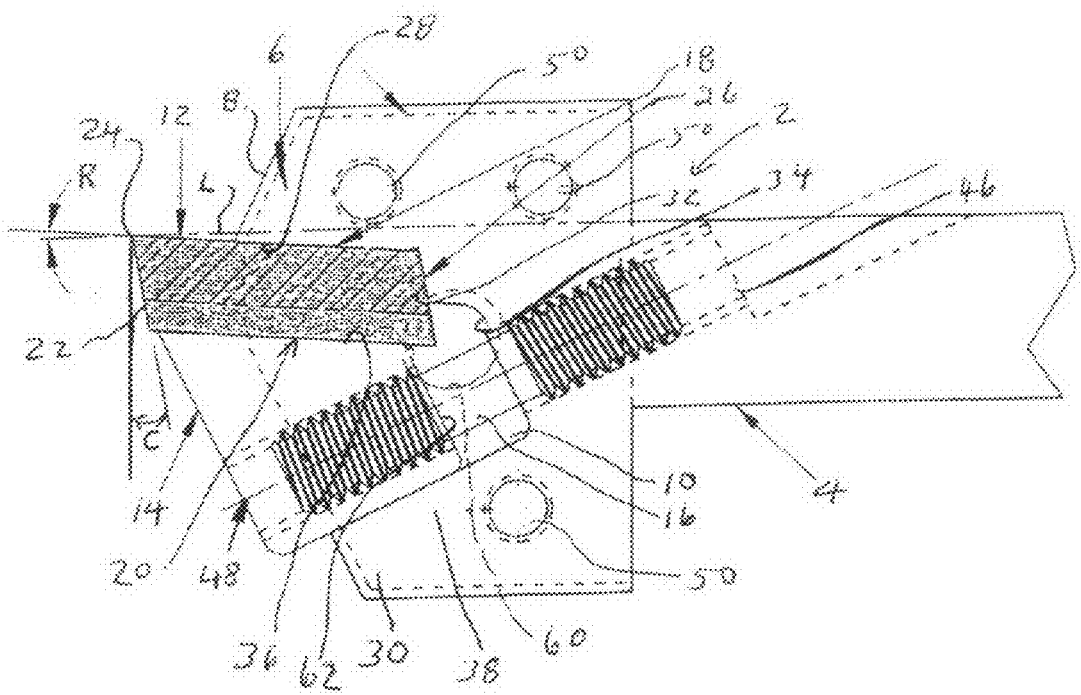
Figure 1
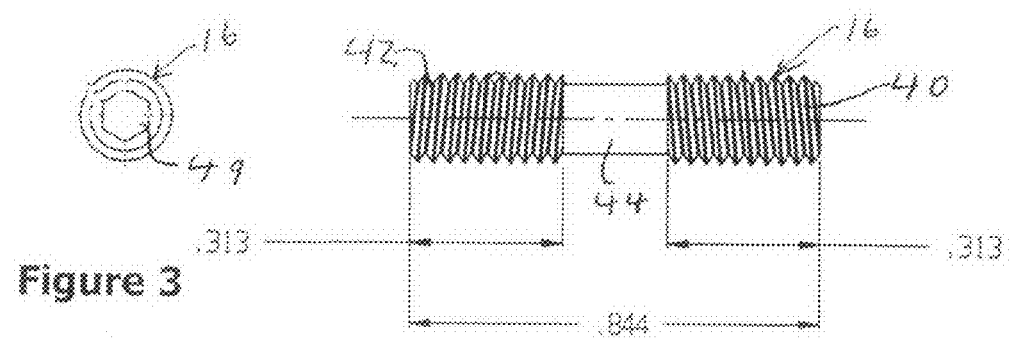
Figure 3
Figure 2

TOOL HOLDER WITH RESHARPENABLE CUTTING TOOL INSERTS

CROSS-REFERENCE TO RELATED APPLICATION

This application claims the priority of U.S. Provisional Patent Application No. 60/966,380 filed on Aug. 27, 2007, the entire disclosure of which is incorporated herein by reference.

TECHNICAL FIELD

This disclosure relates generally to tool holders with resharpenable cutting tool inserts. More particularly, this disclosure relates to a tool holder in which resharpenable cutting tool inserts are easily and properly reinserted into the tool holder.

SUMMARY

Briefly stated, a tool holder for a resharpenable cutting tool insert having a planar top surface, a planar bottom surface and a planar rear surface comprises a body portion which has a front face. A recess extends into the body. The recess is defined by a first planar rear portion providing a locating surface against which the rear surface of the insert is adapted to be positioned. The recess is also defined by a top planar surface against which the top planar surface of the insert is adapted to be located, and a bottom surface extending on an angle with respect to the top surface of the recess. A wedge member is positioned in the recess. The wedge member has a top surface parallel to and spaced from the top surface of the recess. The top surface is adapted to be in engagement with the bottom surface of the cutting tool insert positioned in the tool. The wedge member has a bottom surface in engagement with the bottom surface of the recess. A locking screw locks the wedge member in a position such that the top surface of the wedge member is in engagement with the bottom surface of an insert positioned between the top surface of the wedge member and the top surface of the recess. A locking screw has an axis that is parallel to the bottom surface of the recess. The locking screw is threadably connected to the body portion and to the wedge member.

The threaded connection between the locking screw and the wedge is of a different hand than the threaded connection between the locking screw and the body portion. The locking screw has opposed ends, each of which preferably defines a hex bore. The locking screw has a pair of threaded portions and an intermediate unthreaded portion. Preferably, the threaded portions extend substantially the same length.

DESCRIPTION OF THE DRAWINGS

FIG. 1 is a partial side view, partly in phantom and partly in diagram form, of a tool holder with a cutting tool insert;

FIG. 2 is a plan view, partly in phantom and partly in diagram form, of a locking screw which is used in the tool holder of FIG. 1;

FIG. 3 is an end view of the locking screw of FIG. 2;

DETAILED DESCRIPTION

Figure 6:
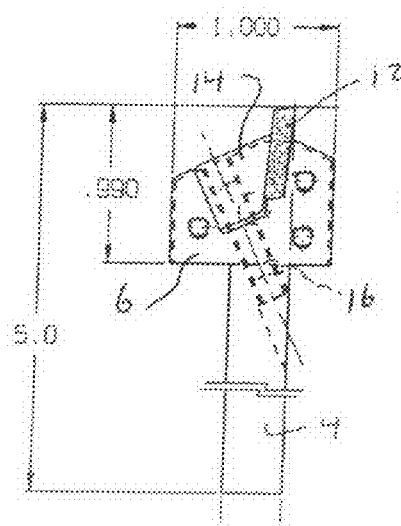
FIG. 6 is a left hand side view, partly in phantom and partly in diagram form, of the tool holder and cutting tool insert of FIG. 4 with the cutting tool insert shown after it has been resharpened a number of times.

Referring to the drawings and in particular FIG. 1, a tool holder 2 according to the embodiment of FIG. 1 may include a shank 4 having an enlarged head portion 6 at one end thereof. The head portion 6 includes a forward face 8 into which a recess 10 extends. A cutting tool insert 12 is positioned in the recess 10 and is held in place by a wedge member 14. The wedge member 14 is secured within the recess 10 by a locking screw 16.

The cutting tool insert 12 is of the resharpenable type and may be of conventional design. Such inserts 12 are generally fabricated from high speed steel, tungsten carbide or other suitable resharpenable cutting tool material and have a generally rectangular transverse cross-section. The cutting tool insert 12 has a top planar surface 18 and a bottom planar surface 20 which are parallel to each other. A front form surface 22 is ground into appropriate shape and forms with the top planar surface 18 a cutting edge profile 24 adapted to remove material from a rotating work piece.

The front form surface 22 has a directrix that extends at an angle with respect to the top planar surface 18. The cutting tool insert 12 has a rear planar surface 26, the straight line directrix of which is parallel to the directrix of the front form surface 22. Thus, the cutting tool insert 12 is bounded by parallel top and bottom planar surfaces 18 and 20 and parallel front and rear surfaces 22 and 26 such that any longitudinal cross section through the cutting tool insert 12 forms a parallelogram.

The recess 10 in the head portion 6 of the tool holder 2 is defined by a top planar surface 28 and a spaced bottom planar surface 30. The top and bottom planar surfaces 28 and 30 are at an angle to each other which opens in a direction facing the front of the recess 10. The recess 10 is bounded in the back by a first rear planar surface 32 which extends at an obtuse angle with respect to the top planar surface 28 of the recess 10. This angle is the same as the angle between the rear surface 26 and the top planar surface 18 of the cutting tool insert 12. The recess 10 is also defined by a second rear planar surface 34 which is disposed to the rear of the first planar rear surface 32 and extends at an angle perpendicular to the bottom planar surface 30.

When the cutting tool insert 12 is mounted in the head portion 6 of the tool holder 2, its top planar surface 18 is positioned against the top planar surface 28 of the recess 10 and its rear planar surface 26 is positioned against the first rear planar surface 32 of the recess 10. The angle of the top planar surface 28 of the recess 10 is such that a pre-selected rake angle "R" is formed with a horizontal center line "L" of a rotating work piece. Additionally, the directrix of the front form surface 22 of the cutting tool insert 12 forms an angle "C" with a vertical line perpendicular to the horizontal center line "L". The rake angle "R" and clearance angles "C" are pre-selected depending upon cutting speed, tool material, work piece material and the angle of which the cutting tool insert is advanced to the work piece.

The cutting tool insert 12 is held in place in the recess 10 of the tool holder 2 by the wedge member 14. The wedge member 14 includes a top planar surface 36 which engages the bottom planar surface 20 of the cutting tool insert 12. The wedge member 14 has a bottom planar surface 38 which is in engagement with the bottom planar surface 30 of the recess 10. With this arrangement, the top planar surface 36 and the bottom planar surface 38 of the wedge member 14 are at an angle with respect to each other equal to the angle between the top and bottom surfaces 28 and 30 of the recess 10.

The locking screw 16 is threadedly connected to the tool holder 2 and wedge member 14 so that when it is rotated in one direction, it can draw the wedge member 14 inwardly so that the wedge member 14 clamps the cutting tool insert 12 between the top planar surface 36 of the wedge member 14 and the top planar surface 28 of the recess 10. Rotation of the locking screw 16 in the opposite direction will tend to move the wedge member 14 in an outward direction, thereby loosening the cutting tool insert 12 permitting its removal from the tool holder 2.

For this purpose, the locking screw 16 includes opposed threaded ends 40 and 42 with an intermediate unthreaded portion 44 as shown in FIG. 2. The ends 40 and 42 are oppositely threaded as shown schematically in FIG. 2. For example, as shown in FIG. 2 the right hand end 40 may be right hand threaded while the left hand end 42 may be left hand threaded. Each of the threads may be #10-32 threads which extend 0.313 inches with the screw having a length of 0.844 inches.

The tool holder 2 has a threaded bore 46 therein which extends from the top of the shank 4 to the second rear surface 34 of the recess 10 as shown in FIG. 1. The axis of the bore 46 extends parallel to the bottom planar surface 30 of the recess 10 as shown. The wedge 14 is also provided with a threaded through bore 48 which is co-axial with the bore 46 in the tool holder 2. The threading of the bore 46 in the tool holder 2 is of a hand to mate with the right hand end 40 of the locking screw 16, which in the embodiment described is right handed. The bore 48 in the wedge member 14 is oppositely threaded to mate with the left hand end 42 of the locking screw 16, and, in the example shown, is left hand threaded. It is to be understood that the hand of the threads may be reversed with the threaded connection between the locking screw 12 and bore 46 in the tool holder being left handed and the threaded connection between the locking screw 12 and bore 46 in the wedge being right handed.

With the locking screw 16 and bores 46 and 48 threaded as described, the locking screw 16 may be threaded into the bore 46 in the tool holder 2 such that the right hand threaded end portion 40 is positioned in the bore 46 and the left hand threaded end portion 42 extends outwardly into the recess 10 and into threaded engagement with the bore 48 in the wedge member 14. With this arrangement, when the locking screw 16 is rotated such that it tends to move rearward out of the bore 46, the forward or left hand threaded end portion 42 which is in engagement with the wedge member 14 tends to cause the wedge member 14 to be threaded onto the locking screw 16. Thus, upon rotation of the locking screw 16 in that direction, not only is the locking screw 16 itself moving rearward relative to the tool holder 2, but also the wedge member 14 is moving rearwardly relative to the locking screw 16 itself.

It should be noted that with the bore 46 in the tool holder extending from the top of the shank 4 to the recess 10 and the coaxial bore in the wedge member 14 extending entirely though the wedge member 14, either end of the screw 16 is accessible for turning. For this purpose, each end of the locking screw 14 is provided with a hex bore 49 for receiving a hex wrench to rotate the screw. In other words, the locking screw 16 is accessible for rotation from either end of the tool holder 2.

Figure 4:
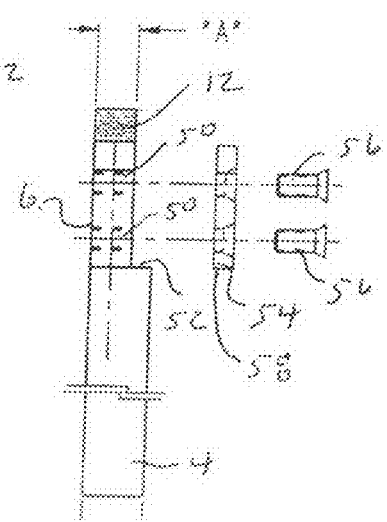
FIG. 4 is an exploded top view, partly in phantom and partly in diagram form, of a tool holder with a cutting tool insert of the type shown in FIG. 1.

The head portion 6 of the tool holder 2 is provided with three threaded bores 50, two of which are positioned above the recess 10 and one below the recess 10 as shown in FIG. 1. As shown in FIG. 4, the shank 4 is of a width greater than the head portion 6 so that a forward facing surface 52 is formed on the shank 4 at its juncture with the head portion 6. A side locking plate 54 is attached to the head portion 6 of the tool holder by means of suitable bolts 56 threadedly connected to the bores 50. The side locking plate 54 includes a rear surface 58 in engagement with the forward facing surface 52 of the tool holder 2. The side locking plate 54 is positioned against the head portion 6 with a portion overlapping the portion of the cutting tool insert 12 positioned within the recess 10. The side locking plate 54 serves as a guide against which a side surface of the cutting tool insert 12 may be pressed when inserted into the tool holder 2 to center the cutting tool insert 12 transversely in the recess 10.

Figure 5:
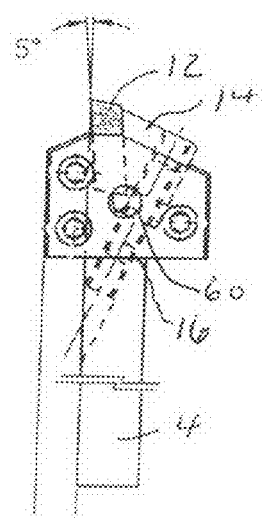
FIG. 5 is a right side view, partly in phantom and partly in diagram form, of the tool holder and cutting insert of FIG. 4 with the insert as shown in its new condition.

The side locking plate 54 may be provided with a circular aperture 60, as shown in FIGS. 1 and 5, which is in alignment with the rear portion of the recess 10 and positioned such that the juncture of the rear planar surface 26 and bottom planar surface 20 of the cutting tool insert 12 is visible through the aperture 60. The aperture 60 aids in chip removal.

When the cutting tool insert 12 gets dull, the cutting tool insert 12 may be removed from the tool holder 2 by rotating the locking screw 16 to move the wedge member 14 forward in the recess 10 thereby freeing the cutting tool insert 12 and permitting its removal. The cutting tool insert may be resharpened by grinding down its top planar surface 18. An individual cutting tool insert 12 can be resharpened a number of times, although the number of resharpenings vary depending upon the type and material of the insert. The sectioned area of the tool insert 12 of FIG. 1 shows the remaining thickness of the insert after the maximum amount has been removed during resharpening. By way of example, the original thickness of the insert 12 is 0.188 inch. After repeated sharpening, the minimum thickness is 0.120 inch.

After each resharpening, the cutting tool insert 12 is repositioned in the tool holder by inserting the cutting tool insert 12 into the recess 10 until its rear surface 26 abuts against the first rear surface 32 of the head portion 6 tool holder 2. The wedge member, 14 is drawn into the recess by rotation of the locking screw 14 until its top planar surface 36 engages the bottom planar surface 20 of the cutting tool insert 12. The locking screw 16 is tightened until the cutting tool insert 12 is securely held in place. As will be noted in FIG. 6, which shows a cutting tool insert 12 after it has been sharpened, when the locking screw 16 is rotated to tighten the wedge, the rear surface 62 of the wedge 14 is drawn rearward closer to the second rear planar surface 34 of the recess 10 opening with the result that the top planar surface 36 of the wedge 14 moves closer to the top surface 28 of the recess 10 clamping the cutting tool insert between the two surfaces 36 and 28.

With this arrangement, even though material is removed from the top surface of the cutting tool insert 12, when the insert 12 is reinserted into the tool holder 2, and positioned with its rear surface 26 against the rear surface 32 of the recess 10, and its newly ground top surface positioned against the top surface 28 of the recess, the cutting edge profile 24 will be located in the same positioned relative to the tool holder 2 as it was before sharpening. This eliminates the need for repositioning the tool holder 2.

Figures 7, 8, 9:
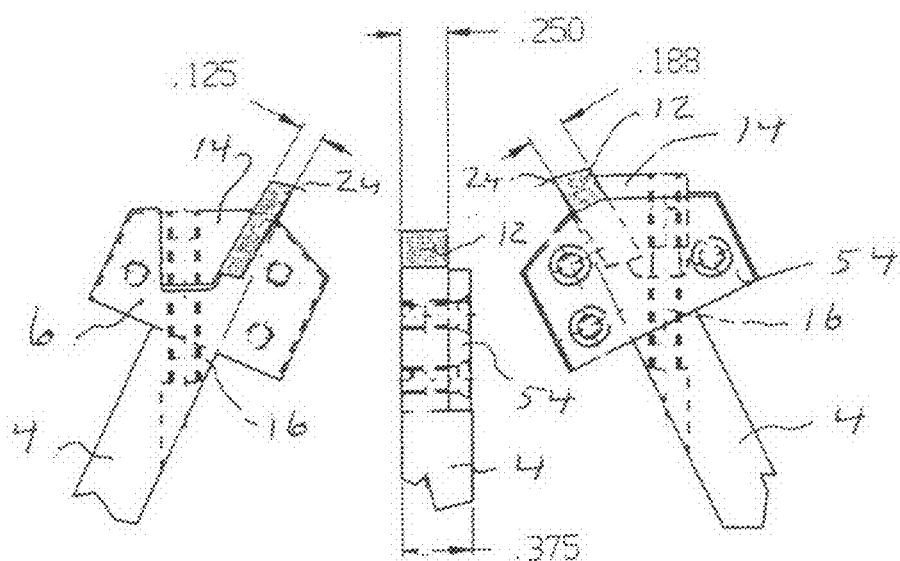
FIG. 7 is a top plan view, partly in phantom and partly in diagram form, of a tool holder with a reusable cutting tool insert showing a side locking plate attached thereto.
FIG. 8 is a right side view, partly in phantom and partly in diagram form, of a tool holder and cutting tool insert of FIG. 7 with a cutting tool insert in its new condition.
FIG. 9 is a left side view, partly in phantom and partly in diagram form, of the tool holder and cutting tool insert of FIG. 8, showing the cutting tool insert after it had been sharpened a number of times.

By way of example, in the embodiments shown in FIGS. 7-9, the original thickness of the cutting tool insert 12 was 0.188 inch with a width of 0.250 inch. After a number of sharpenings, the thickness has been reduced to 0.125 inch as shown in FIG. 9. However, its cutting edge profile 24 is located in the same position relative to the tool holder 2.

Figures 10, 11, 12:
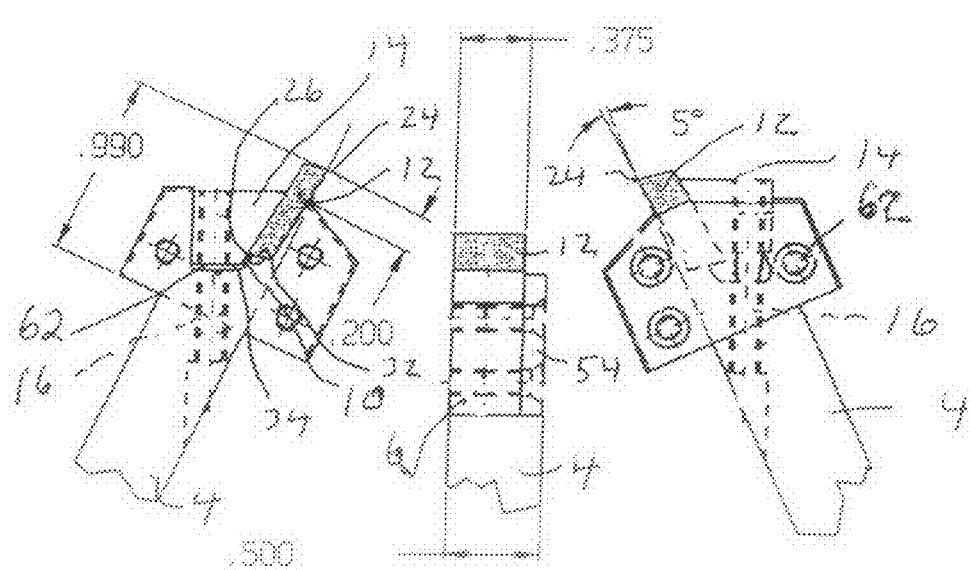
FIG. 10 is a top plan view, partly in phantom and partly in diagram form, of a tool holder with a reusable cutting tool insert showing a cutting tool insert having a wider configuration than shown in the previous Figures.
FIG. 11 is a right side view, partly in phantom and partly in diagram form, of the cutting tool and insert of FIG. 10.
FIG. 12 is a left side view, partly in phantom and partly in diagram form, of the cutting tool and insert of FIG. 11 showing the cutting tool insert after it has been sharpened a number of times and thereby reduced in thickness.

In the embodiment shown in FIGS. 10-12, the cutting tool insert 12 has a width of 0.375 inch. The width of the tool body and tool are appropriately sized with the tool shank having a width of 0.500 inch. FIG. 11 shows the arrangement with the cutting tool being newly inserted into the cutting tool, while FIG. 12 shows the cutting tool insert 12 after repeated sharpenings. As noted, the cutting tool insert 12 is positioned in the tool holder 2 with its rear surface 26 positioned against the first rear surface 32 of the recess and the wedge 14 is drawn into the recess 10 such that its rear surface 62 is closer to the second rear surface 34 of the recess 10. However, as will be noted, the cutting edge profile 24 in the case of the resharpened insert is located in the same position relative to the tool holder 2 as in the case of the new cutting tool insert 2 shown in FIG. 11.

While various embodiments have been shown and described, various alterations and substitutions may be made thereto. Accordingly, it is understood that the present embodiments have been described by way of illustration and not limitation.

The invention claimed is:

1. A tool holder for a resharpenable cutting tool insert having a planar top surface, a planar bottom surface and a planar rear surface comprising:
    a body portion having a front face;
    a recess extending into said body portion, said recess being defined by a first planar rear portion providing a locating surface against which the rear surface of said insert is adapted to be positioned, a top planar surface against which the top planar surface of said insert is adapted to be located, and a bottom surface extending at an angle with respect to said top surface of said recess;
    a wedge member positioned in said recess having a top surface parallel to and spaced from said top surface of said recess and adapted to be in engagement with the bottom surface of a cutting tool insert positioned in said tool, and a bottom surface in engagement with the bottom surface of said recess; and
    a locking screw for locking said wedge member in a position such that the top surface of said wedge member is in engagement with the bottom surface of an insert positioned between said top surface of said wedge member and said top surface of said recess, said locking screw having an axis that is parallel to the bottom surface of said recess, said locking screw being threadedly connected to said body portion and to said wedge member.

2. The tool holder of claim 1 wherein the threaded connection between said locking screw and said wedge is of a different hand than the threaded connection between said locking screw and said body portion.

3. The tool holder of claim 1 wherein said locking screw has opposed ends, each of which has a hex bore.

4. The tool holder of claim 1 wherein said locking screw has a pair of threaded portions and an intermediate unthreaded portion.

5. The tool holder of claim 4 wherein the threaded portions extend substantially the same length.

6. A tool holder for a resharpenable cutting tool insert having a planar first surface, a planar opposing second surface and a planar third surface comprising:
    a body portion having a front face;
    a recess extending into said body portion, said recess being defined by a planar portion providing a locating surface against which the third surface of said insert is adapted to be positioned, a first planar recess surface against which the first planar surface of said insert is adapted to be located, and a second recess surface extending at an angle with respect to said first surface of said recess;
    a wedge member positioned in said recess having a first wedge surface parallel to and spaced from said first surface of said recess and adapted to be in engagement with the second surface of a cutting tool insert positioned in said tool, and a second wedge surface in engagement with the second surface of said recess; and
    a locking screw for locking said wedge member in a position such that the first surface of said wedge member is in engagement with the second surface of an insert positioned between said first surface of said wedge member and said first surface of said recess, said locking screw having an axis that is parallel to the second surface of said recess, said locking screw being threadedly connected to said body portion and to said wedge member.

7. The tool holder of claim 6 wherein the threaded connection between said locking screw and said wedge is of a different hand than the threaded connection between said locking screw and said body portion.

8. The tool holder of claim 6 wherein said locking screw has opposed ends, each of which has a hex bore.

9. The tool holder of claim 6 wherein said locking screw has a pair of threaded portions and an intermediate unthreaded portion.

10. The tool holder of claim 9 wherein the threaded portions extend substantially the same length.

* * * * *